(12) United States Patent
Lee et al.

(10) Patent No.: US 8,624,797 B2
(45) Date of Patent: Jan. 7, 2014

(54) MOBILE TERMINAL AND CONTROLLING METHOD THEREOF

(75) Inventors: Yun Sung Lee, Seoul (KR); Seong Joon Park, Seoul (KR); Gi Hoon Tho, Seoul (KR); Ho Phil Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 582 days.

(21) Appl. No.: 12/895,746

(22) Filed: Sep. 30, 2010

(65) Prior Publication Data

US 2011/0084893 A1    Apr. 14, 2011

(30) Foreign Application Priority Data

Oct. 9, 2009    (KR) .................. 10-2009-0096210

(51) Int. Cl.
    *G09G 5/00* (2006.01)
(52) U.S. Cl.
    USPC .............................. 345/4; 345/1.1
(58) Field of Classification Search
    USPC ................. 345/1.1, 1.3, 4, 5, 6, 173, 175; 178/18.03–18.09; 715/863, 864
    See application file for complete search history.

(56) References Cited

U.S. PATENT DOCUMENTS

| | | | |
|---|---|---|---|
| 6,054,969 A | | 4/2000 | Haisma |
| 6,466,202 B1 * | | 10/2002 | Suso et al. ............... 345/169 |
| 6,512,607 B1 * | | 1/2003 | Windsor et al. .......... 359/15 |
| 7,333,072 B2 * | | 2/2008 | Yamazaki et al. ......... 345/5 |
| 7,669,543 B2 * | | 3/2010 | Soltendieck et al. ...... 116/62.4 |
| 7,724,208 B1 * | | 5/2010 | Engel et al. ............ 345/4 |
| 2001/0038412 A1 * | | 11/2001 | McNelley et al. ........ 348/14.1 |
| 2004/0029636 A1 | | 2/2004 | Wells |
| 2005/0040753 A1 | | 2/2005 | Osame et al. |
| 2006/0133047 A1 | | 6/2006 | Tomizuka et al. |
| 2007/0150180 A1 | | 6/2007 | Matsuo et al. |
| 2009/0132130 A1 * | | 5/2009 | Kumon et al. ............. 701/49 |
| 2009/0207124 A1 | | 8/2009 | Park et al. |
| 2009/0295976 A1 * | | 12/2009 | Choi ..................... 348/333.11 |

FOREIGN PATENT DOCUMENTS

WO    2008/041313    4/2008

OTHER PUBLICATIONS

European Patent Office Application Serial No. 10186446.0, Search Report dated Oct. 8, 2013, 10 pages.

* cited by examiner

*Primary Examiner* — Tom Sheng
(74) *Attorney, Agent, or Firm* — Lee, Hong, Degerman, Kang & Waimey

(57) ABSTRACT

A mobile terminal is presented. The mobile terminal includes a main display unit comprising a first display unit, a transparent display unit comprising a second display unit, the transparent display unit being attached to the main display unit such that the transparent display unit may be viewed at an angle in comparison to the main display unit, and a controller controlling a three-dimensional (3D) and a two-dimensional (2D) image to be output by selectively displaying an image on at least the first display unit or the second display unit while the main display unit and the transparent display unit are positioned at an angle.

23 Claims, 17 Drawing Sheets

(a)

(b)

FIG. 6
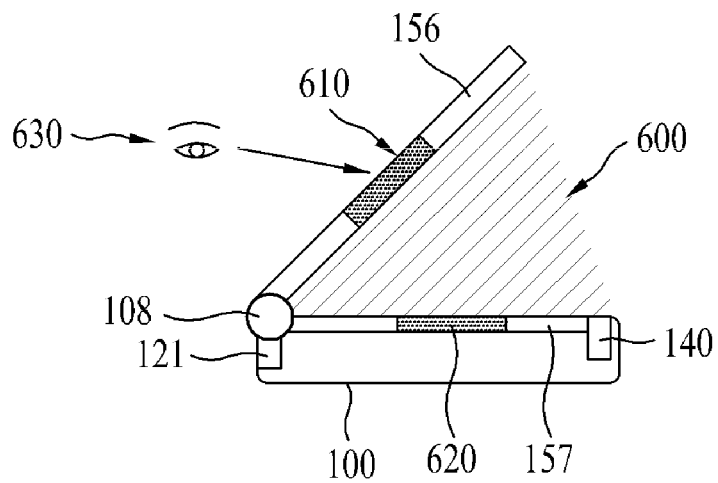
(a)
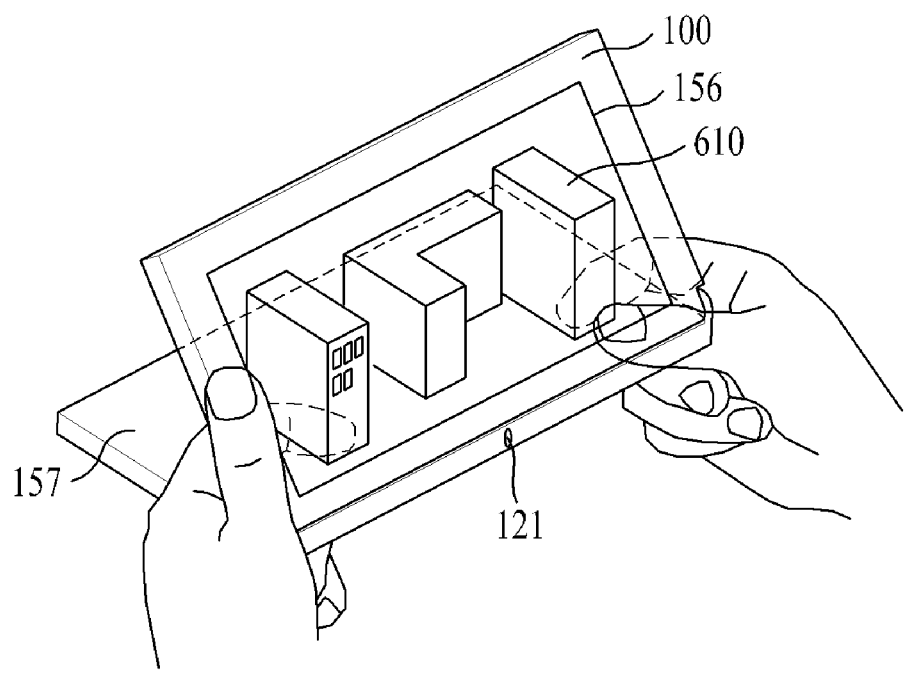
(b)

FIG. 8
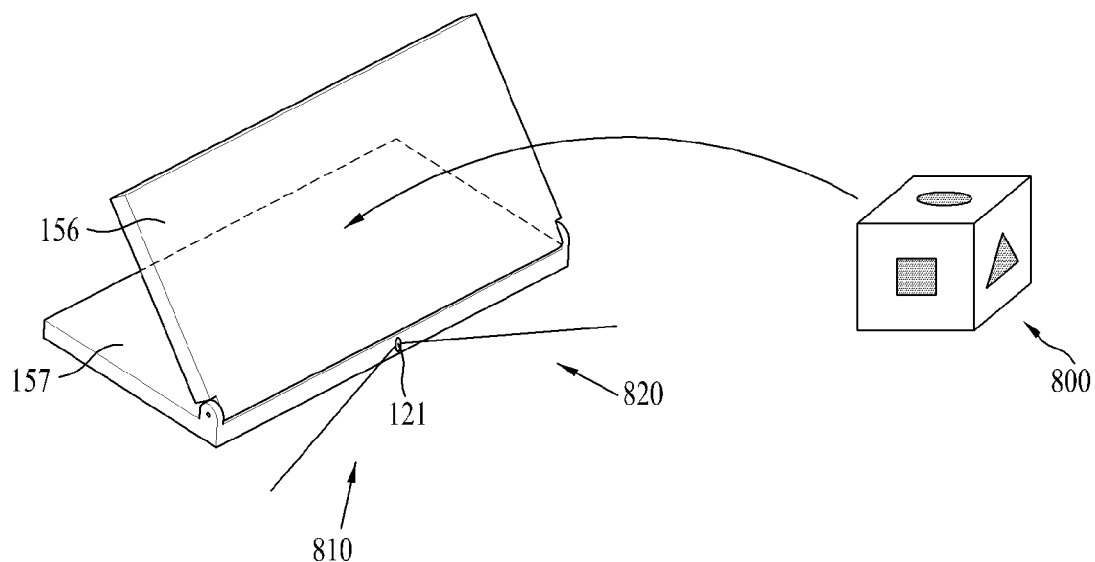
(a)
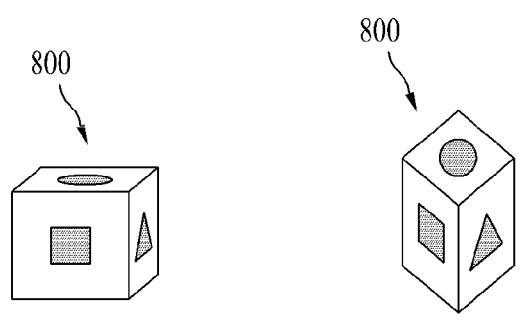
(b)  (c)

FIG. 9
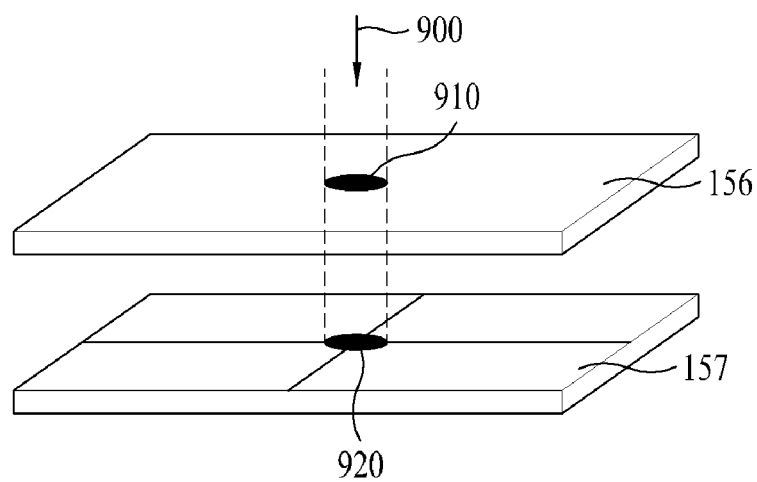
(a)
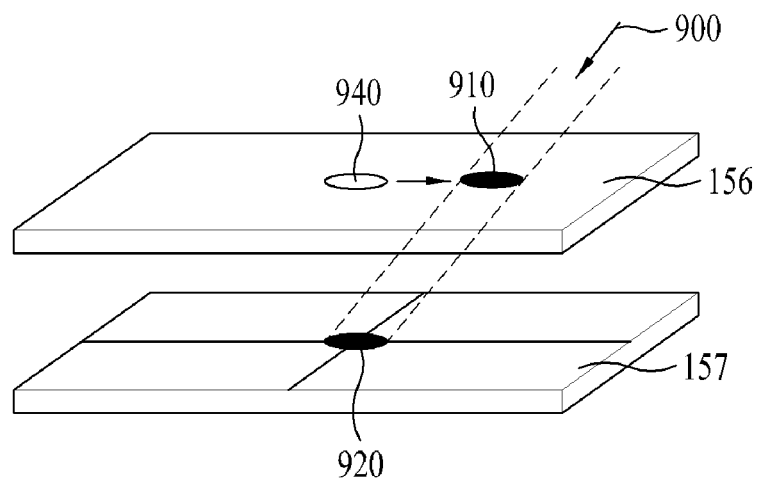
(b)

FIG. 10
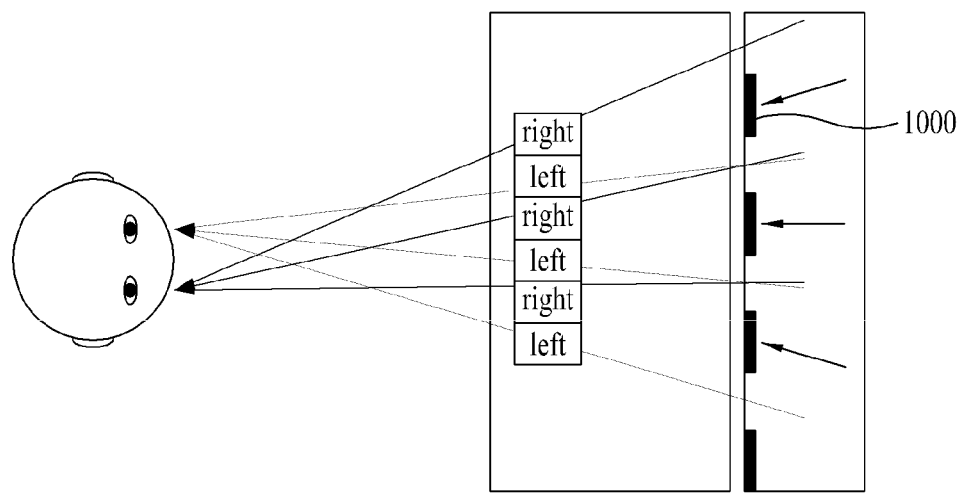
(a)
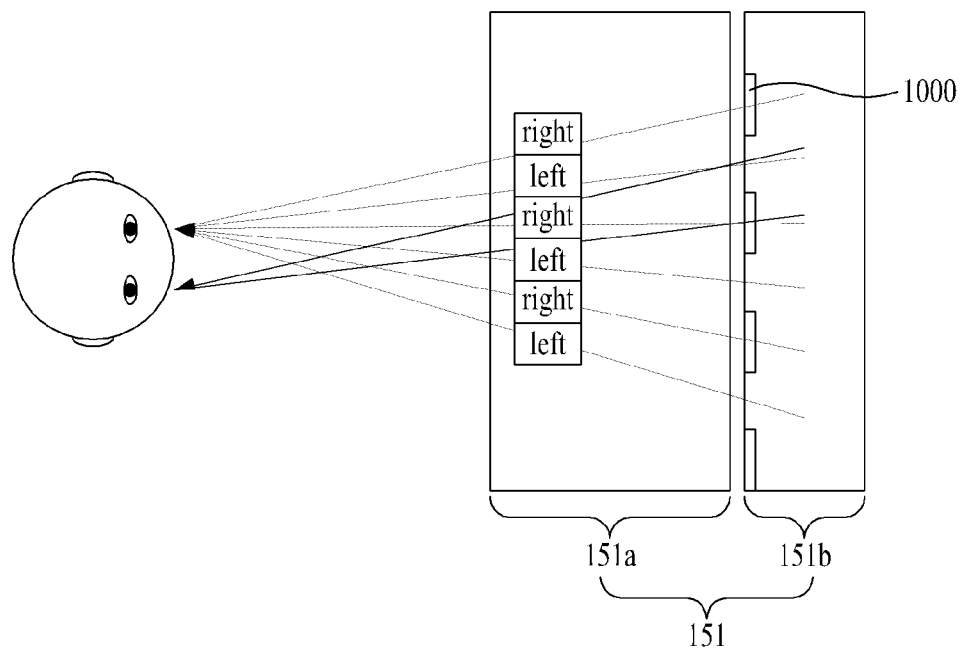
(b)

FIG. 11
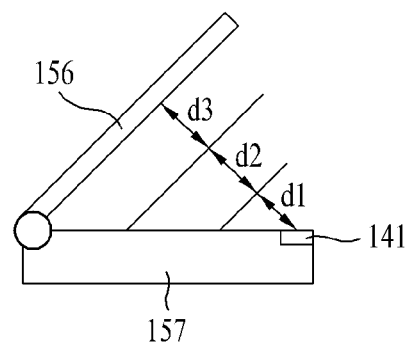
(a)
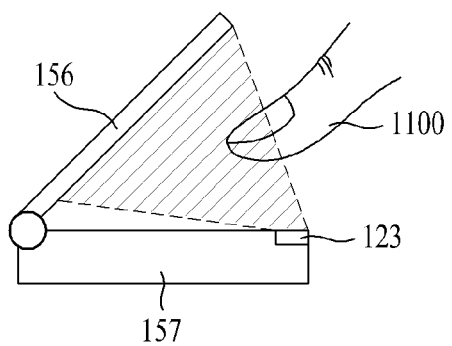
(b)
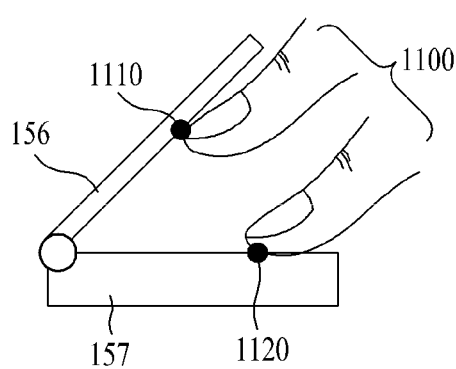
(c)
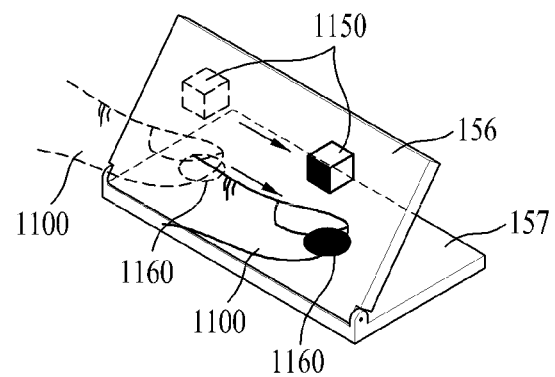
(d)

FIG. 12
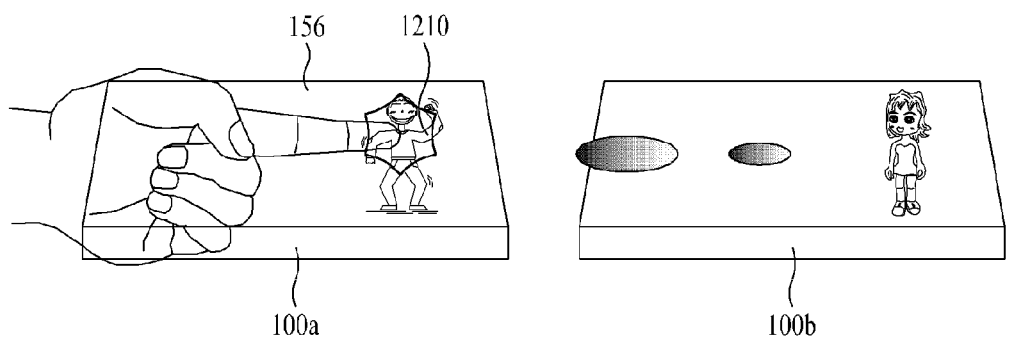
(a)
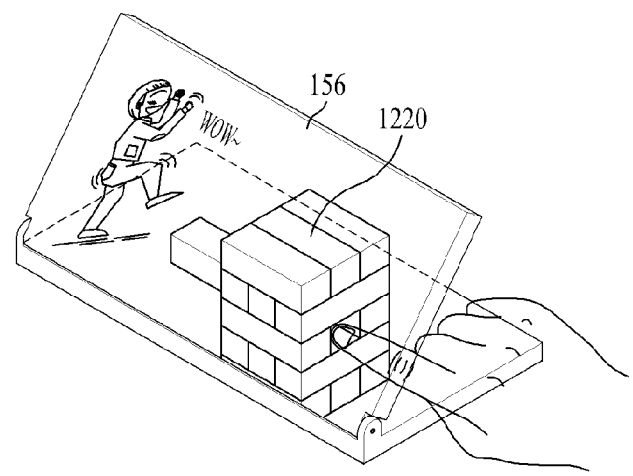
(b)

FIG. 14
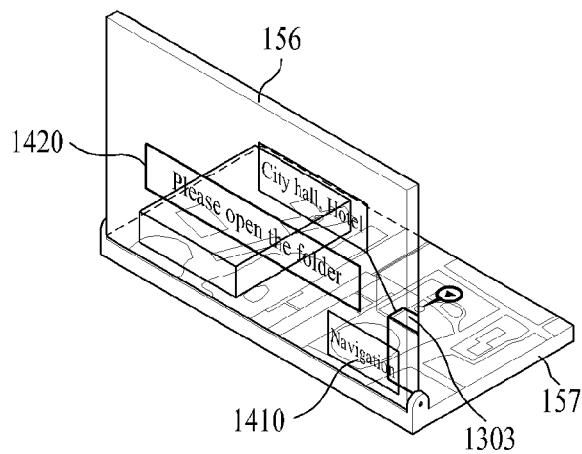
(a)
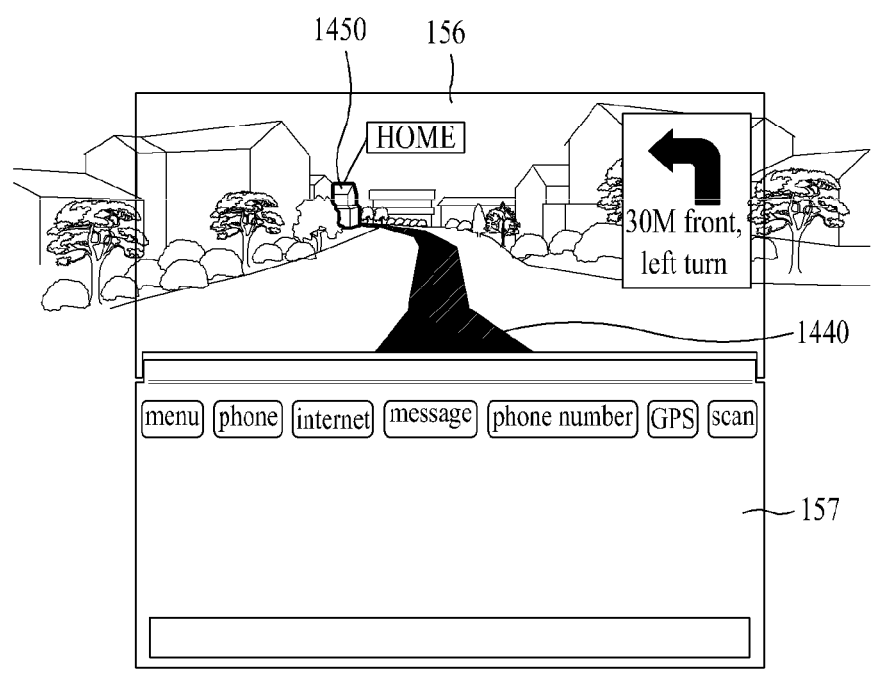
(b)

FIG. 15
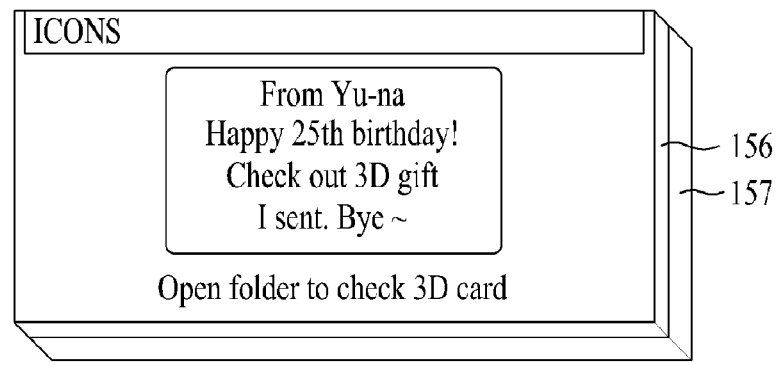
(a)
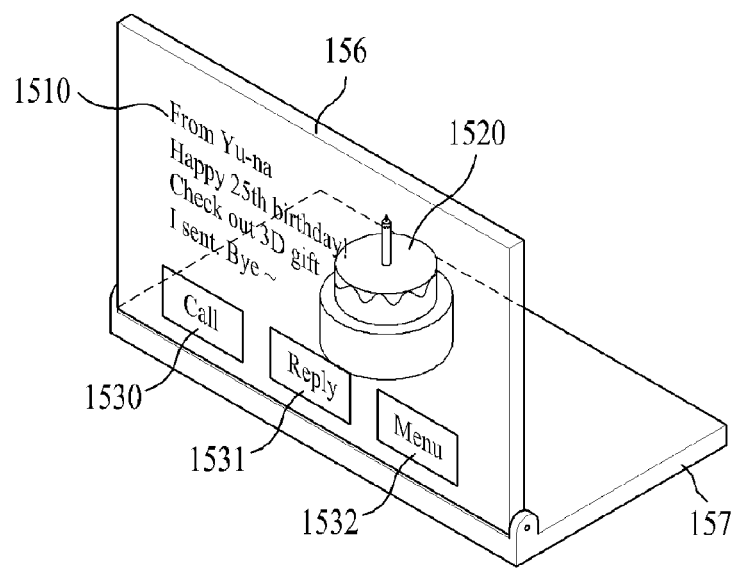
(b)

FIG. 16
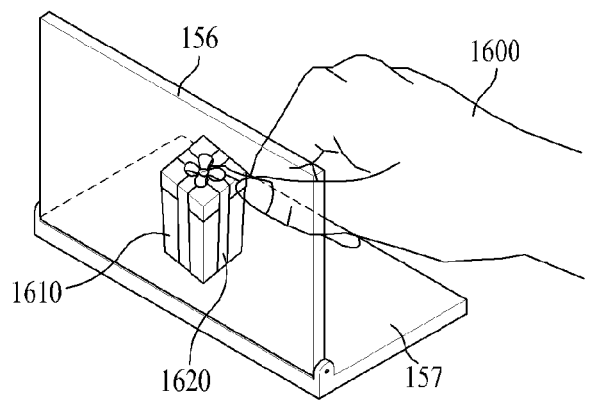
(a)
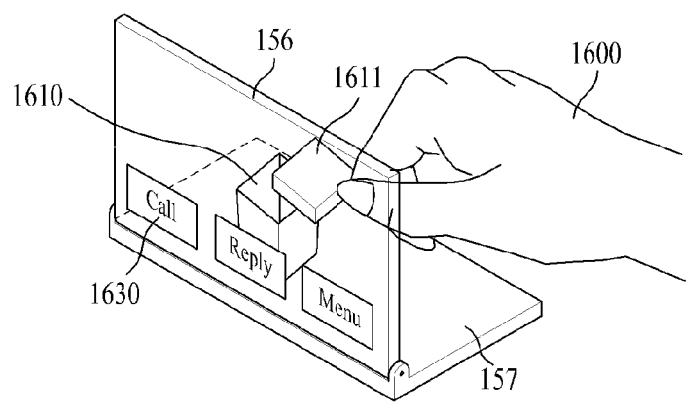
(b)
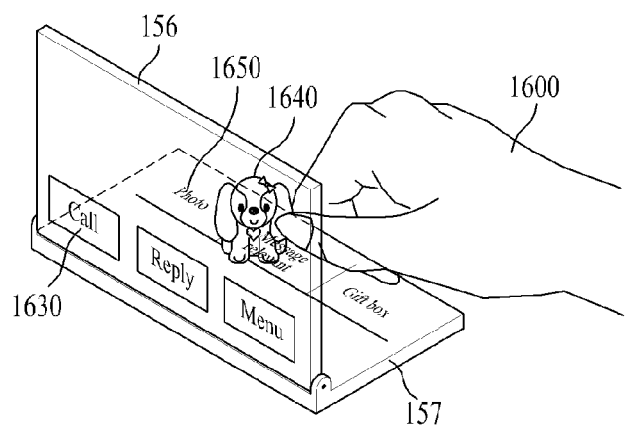
(c)

FIG. 17
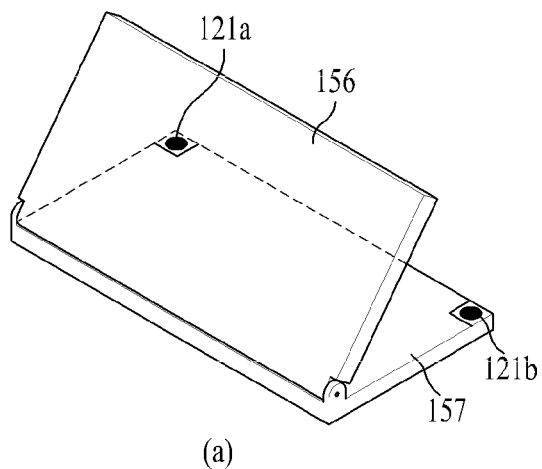
(a)
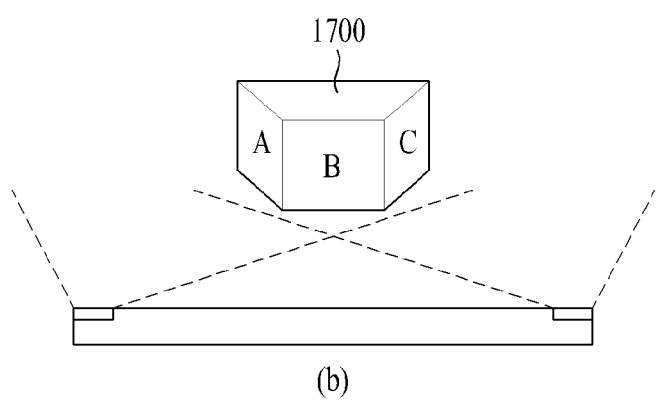
(b)
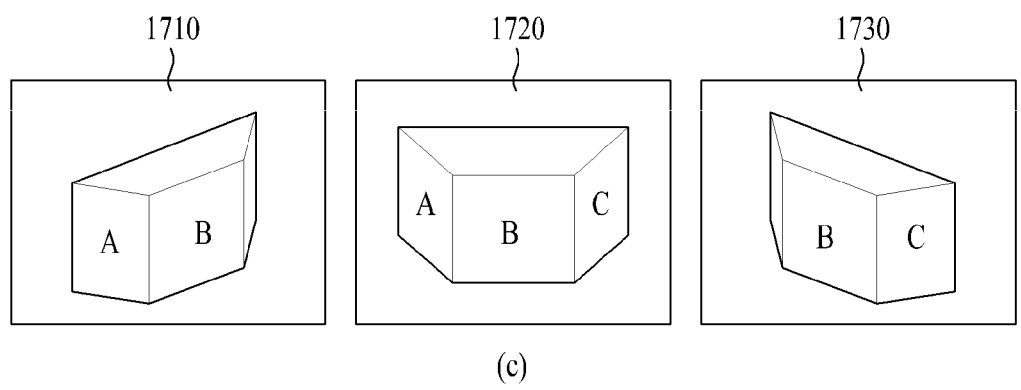
(c)

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2009-0096210, filed on Oct. 9, 2009, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for providing at least two display units including a transparent display unit.

2. Discussion of the Related Art

Generally, terminals can be classified as mobile terminals and stationary terminals according to their mobility. Mobile terminals can be classified into handheld terminals and vehicle mounted terminals according to their handheld portability.

As functions of the terminals are diversified, the terminals are implemented into multimedia players provided with complex functions for photography, playback of music or video, game play, and broadcast reception.

In order to support and enhance the terminal functions, structural and software improvements for the terminal may be taken into consideration.

Recently, since a mobile terminal can be provided with an optical transparent display device, many efforts have been made to provide more convenient and diverse functions.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to one embodiment, a mobile terminal is presented. The mobile terminal includes a main display unit comprising a first display unit, a transparent display unit comprising a second display unit, the transparent display unit being attached to the main display unit such that the transparent display unit may be viewed at an angle in comparison to the main display unit, and a controller controlling a three-dimensional (3D) and a two-dimensional (2D) image to be output by selectively displaying an image on at least the first display unit or the second display unit while the main display unit and the transparent display unit are positioned at an angle.

According to one feature, the transparent display unit further comprises a third display unit, such that the third display unit is adjacent to the first display unit and the second display unit is opposite the third display unit. Additionally, the 3D image is visible when the second display unit faces a user. Moreover, the 2D image is displayed on at least the first display unit or the third display unit when the main display unit and the transparent display unit are positioned at an angle. Furthermore, the 2D image is displayed on at least the second display unit or the third display unit when the mobile terminal is in a closed state. Finally, the 2D image is simultaneously displayed on at least the first display unit, the second display unit, or the third display unit when the 3D image is visible from the second display unit.

According to another feature, the transparent display unit is deactivated when the mobile terminal is in a closed state, such that the transparent display unit covers the main display unit.

According to yet another feature, the mobile terminal includes a first camera configured to photograph a user's image, wherein the controller detects a view point of the user via the user's image, corrects a position of an image displayed on the second display unit to correspond to the detected view point, and controls the image displayed on the second display unit to be displayed at a predetermined position on the first display unit. Additionally, the mobile terminal includes a memory unit configured to store a lookup table including a correction value for correcting the position of the image displayed on the second display unit according to the detected view point of the user, wherein the controller performs the position correction of the image displayed on the second display unit by referring to the lookup table.

According to yet another feature an interactive menu is displayed on at least the second display unit or third display unit when the 3D image is visible from the second display unit.

According to still yet another feature, the mobile terminal includes a pointer detecting unit configured to detect a position of a pointer in a space formed between the transparent display unit and the main display unit, wherein the controller controls an operation corresponding to the pointer position detected by the pointer detecting unit to be executed via a 3D user interface.

According to another feature, when a 3D map image is visible from the second unit, a 2D map corresponding to the 3D map is displayed on the first display unit and an interactive menu for receiving user input is displayed on at least the third display unit, the second display unit, or the first display unit.

According to another embodiment, a mobile terminal is presented. The mobile terminal includes a main display unit configured to display a first display, a transparent display unit configured to display a second display, the transparent display unit being attached to the main display unit such that the transparent display unit may be viewed at an angle in comparison to the main display unit, and a controller controlling a three-dimensional (3D) image to be output by selectively displaying an image on at least one of the first display and the second display while the main display unit and the transparent display unit are spaced apart from each other.

According to yet another embodiment, a method for displaying an image is presented. The method includes displaying an image on a main display unit comprising a first display unit, displaying a second image on a transparent display unit comprising a second display unit, the transparent display unit being attached to the main display unit such that the transparent display unit may be viewed at an angle in comparison to the main display unit, and displaying a three-dimensional (3D) or a two-dimensional (2D) image by selectively displaying at least the first or second image while the main display unit and the transparent display unit are positioned at an angle.

According to still yet another embodiment, a method for displaying an image is presented. The method includes displaying an image on a main display unit comprising a first display unit, displaying a second image on a transparent display unit comprising a second display unit, the transparent display unit being attached to the main display unit such that the transparent display unit may be viewed at an angle in comparison to the main display unit, and displaying a three-dimensional (3D) image by selectively displaying at least the first or second image while the main display unit and the transparent display unit are positioned at an angle.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram illustrating a mobile terminal according to one embodiment of the present invention using the basic principle described with reference to FIG. 5.

FIG. 8 is a diagram of one example of correcting a picture displayed on a transparent display unit through recognition of user's position relative to a mobile terminal according to one embodiment of the present invention.

FIG. 9 is a diagram of another example of correcting a picture displayed on a transparent display unit through recognition of user's position relative to a mobile terminal according to one embodiment of the present invention.

FIG. 10 is a diagram for a method of implementing a 3D image on a parallax barrier type display unit applicable to embodiments of the present invention.

FIG. 11 is a diagram illustrating a method of inputting a command to a mobile terminal and a method of recognizing the command according to one embodiment of the present invention.

FIG. 12 is a diagram of one example of games playable in a mobile terminal according to one embodiment of the present invention.

FIG. 14 is a diagram of another example of executing a navigation function in a mobile terminal according to one embodiment of the present invention.

FIG. 15 is a diagram illustrating displaying a 3D message in a mobile terminal according to one embodiment of the present invention.

FIG. 16 is a diagram of one example of displaying a 3D gift interactive with a user in a mobile terminal according to one embodiment of the present invention.

FIG. 17 is a diagram of one example of generating and displaying a 3D photo in a mobile terminal according to another embodiment of the present invention.

DETAILED DESCRIPTION OF THE INVENTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, digital televisions (DTVs), computers, digital broadcast terminals, personal digital assistants, portable multimedia players (PMPs) and/or navigators.

A further description may be provided with regard to a mobile terminal, although such teachings may apply equally to other types of terminals.

Figure 1:
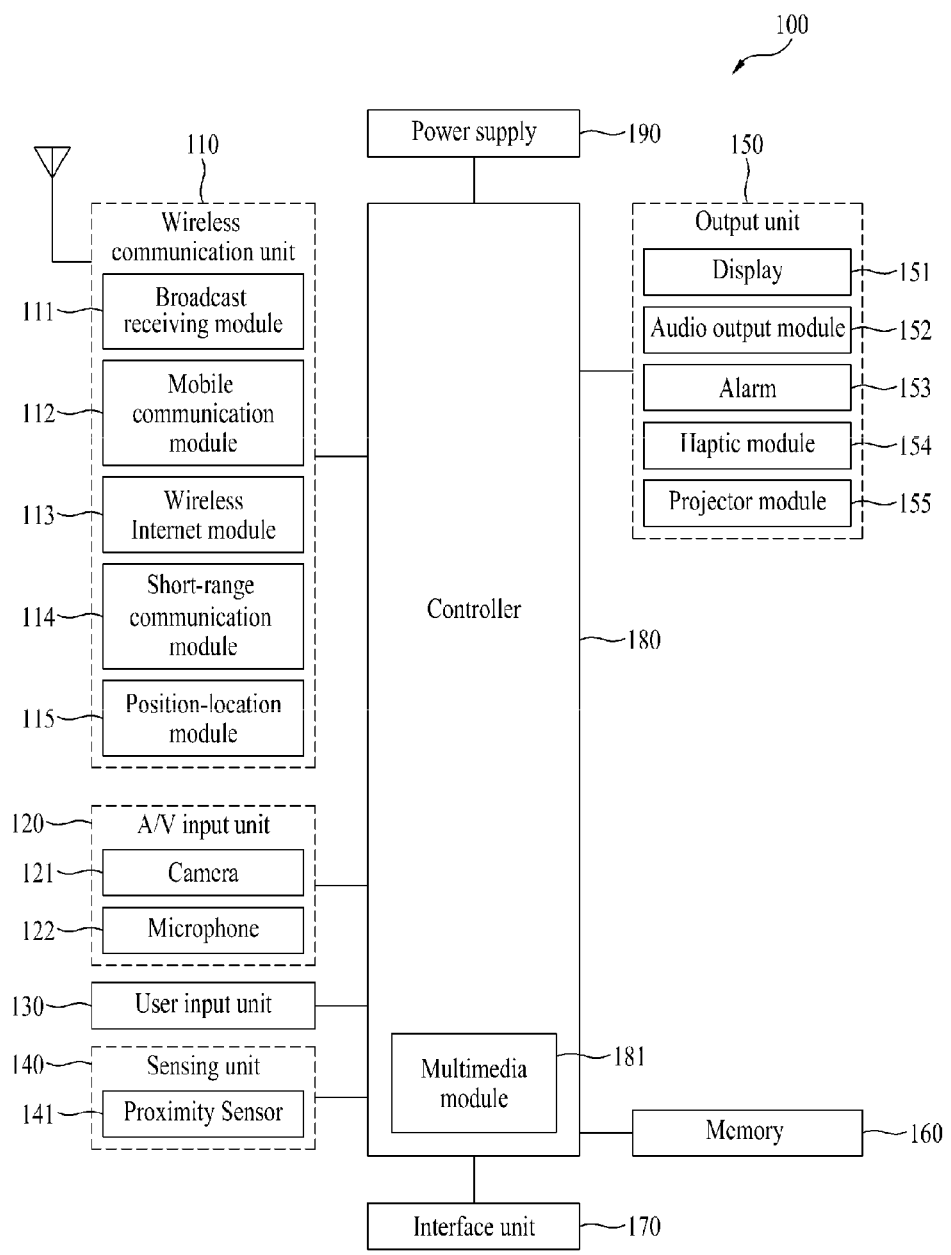
FIG. 1 is a block diagram of a mobile terminal according to one embodiment of the present invention.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wired communication unit. The wireless communication unit 110 and the wired communication unit may be commonly referred to as a communication unit.

Examples of broadcast associated information may include information associated with a broadcast channel, a broadcast program, a broadcast service provider, etc. For example, broadcast associated information may include an electronic program guide (EPG) of a digital multimedia broadcasting (DMB) system and an electronic service guide (ESG) of a digital video broadcast-handheld (DVB-H) system.

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include a digital multimedia broadcasting-terrestrial (DMB-T) system, a digital multimedia broadcasting-satellite (DMB-S) system, a digital video broadcast-handheld (DVB-H) system, a data broadcasting system known as media forward link only (MediaFLO®) and an integrated services digital broadcast-terrestrial (ISDB-T) system. The reception of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wired Internet module in non-mobile terminals. The wireless Internet module 113 and the wired Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current three-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular, the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100. The sensing unit 140 may also comprise a proximity sensor 141.

The mobile terminal 100 may be configured as a slide-type mobile terminal. In such a configuration, the sensing unit 140 may sense whether a sliding portion of the mobile terminal 100 is opened or closed. The sensing unit 140 may also sense presence or absence of power provided by the power supply 190, presence or absence of a coupling or other connection between the interface unit 170 and an external device, etc.

The output unit 150 may generate an output relevant to a sight sense, an auditory sense, a tactile sense and/or the like. The output unit 150 may include a display 151, an audio output module 152, an alarm 153, a haptic module 154, a projector module 155, and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a three-dimensional (3D) display.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wired/wireless headset port, an external charger port, a wired/wireless data port, a memory card port, a port for coupling to a device having an identity module, an audio input/output (I/O) port, a video input/output (I/O) port, an earphone port and/or the like.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

Moreover, the controller 180 is able to perform a pattern recognizing process for recognizing a writing input and a picture drawing input carried out on the touchscreen as characters or images, respectively.

The controller 180 may perform pattern recognizing processing for recognizing a handwriting input performed on the touchscreen as a character and/or recognizing a picture drawing input performed on the touchscreen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2:
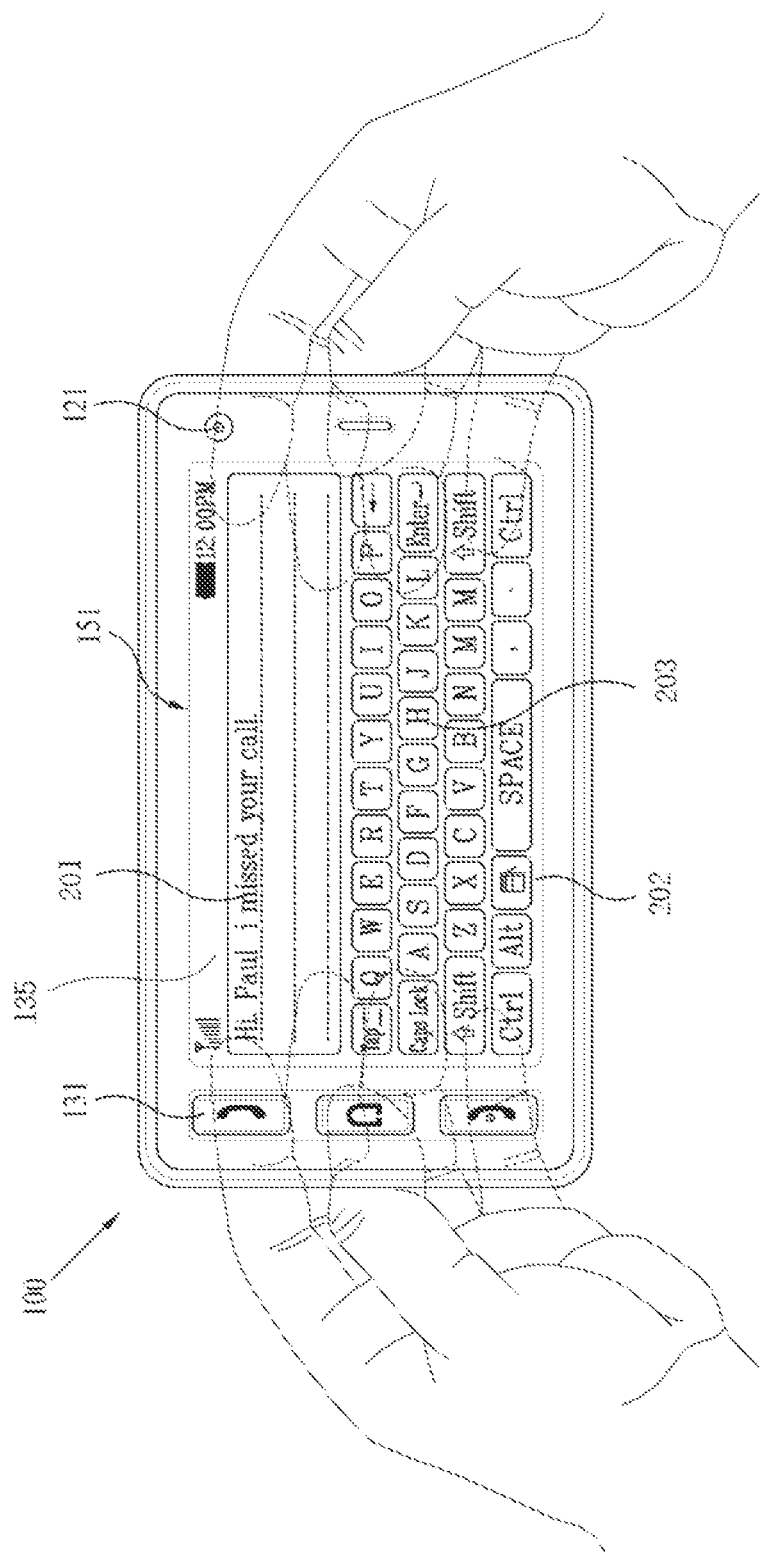
FIG. 2 is a front view diagram of a mobile terminal for describing one operational state of the mobile terminal according to an embodiment the present invention.

FIG. 2 is a front-view diagram of a terminal according to one embodiment of the present invention for explaining an operational state thereof.

Visual information can be displayed on the display 151. For example, the information may comprise characters, numerals, symbols, graphics, icons and the like.

In order to input the information, at least one of the characters, numerals, symbols, graphics and icons are represented as a single predetermined array to be implemented in a keypad formation. The keypad formation may be referred to as "soft keys."

FIG. 2 illustrates that a touch applied to a soft key is input via a rear face of a terminal body. FIG. 2 illustrates an example wherein the terminal body is horizontally arranged (landscape). The display 151 may be configured to adjust an output picture according to the direction of the terminal body.

In FIG. 2, it is shown that a text input mode is activated in the terminal.

An output window 201 and an input window 202 are displayed on the display 151. A plurality of soft keys 203 representing at least one of characters, symbols and digits can be arranged in the input window 202. The soft keys 203 can be arranged in the QWERTY key formation.

If the soft keys 203 are touched via the touchpad, the characters, symbols and digits corresponding to the touched soft keys are outputted to the output window 201. Thus, the touch input via the touchpad 135 is advantageous in that the soft keys 203 can be prevented from being blocked by a finger in case of touch, which is compared to the touch input via the display 151. In case that the display 151 and the touchpad 135 are configured transparent, a user may view an input device, such as fingers, located at the backside of the terminal body.

The display 151 or the touchpad 135 can be configured to receive a touch input by scroll. A user scrolls the display 151 or the touchpad 135 to shift a cursor or pointer displayed on the display 151. Furthermore, a path of a shifted input device may also be visually displayed on the display 151. This may be useful in editing an image displayed on the display 151.

Additionally, both of the display 151 and the touchpad 135 may be touched together within a predetermined time in order to execute a function of the terminal. The above example of the simultaneous touch may correspond to a case that the terminal body is held by a user using a thumb and a first finger (clamping). The executed function may include activation or deactivation for the display 151 or the touchpad 135.

The proximity sensor 141 described with reference to FIG. 1 is explained in detail with reference to FIG. 3 as follows.

Figure 3:
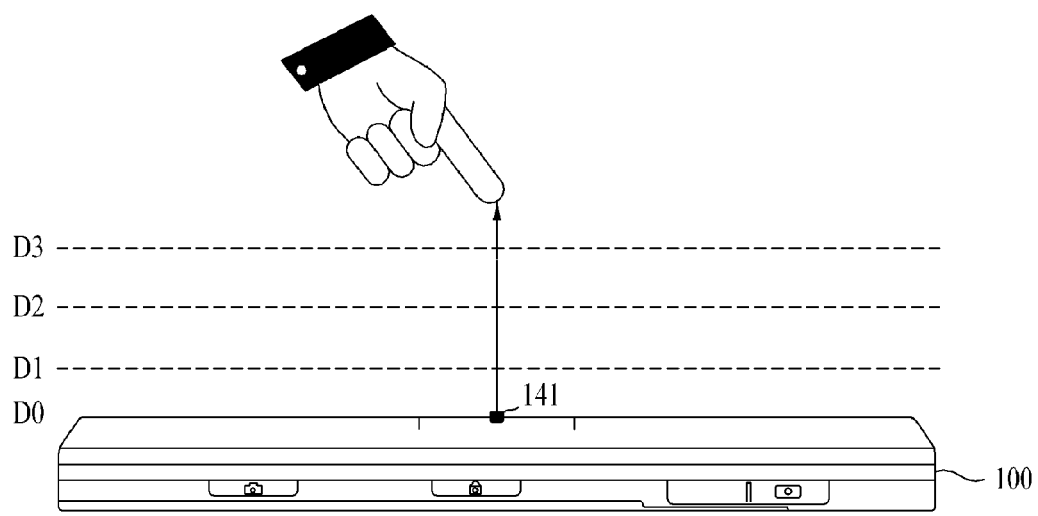
FIG. 3 is a diagram for describing proximity depth of a proximity sensor.

FIG. 3 illustrates a proximity depth of the proximity sensor.

As shown in FIG. 3, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen, referred to as "proximity depth."

The distance in which the proximity signal is output when the pointer approaches the touch screen is referred to as a "detection distance." The proximity depth may be determined via a plurality of proximity sensors having different detection distances and comparing proximity signals respectively output from the proximity sensors.

The proximity sensor is capable of sensing three proximity depths. Alternatively, proximity sensors capable of sensing less than three or more than three proximity depths may be arranged in the touch screen.

Specifically, when the pointer completely comes into contact with the touch screen (D0), it is recognized as a contact touch. When the pointer is located within a distance D1 from the touch screen, it is recognized as a proximity touch of a first proximity depth. When the pointer is located in a range between the distance D1 and a distance D2 from the touch screen, it is recognized as a proximity touch of a second proximity depth. When the pointer is located in a range between the distance D2 and a distance D3 from the touch screen, it is recognized as a proximity touch of a third proximity depth. When the pointer is located beyond the distance D3 from the touch screen, it is recognized as a cancellation of a proximity touch.

Accordingly, the controller 180 can recognize the proximity touch as various input signals according to the proximity distance and proximity position of the pointer with respect to the touch screen and perform various operation controls according to the input signals.

Figure 4:
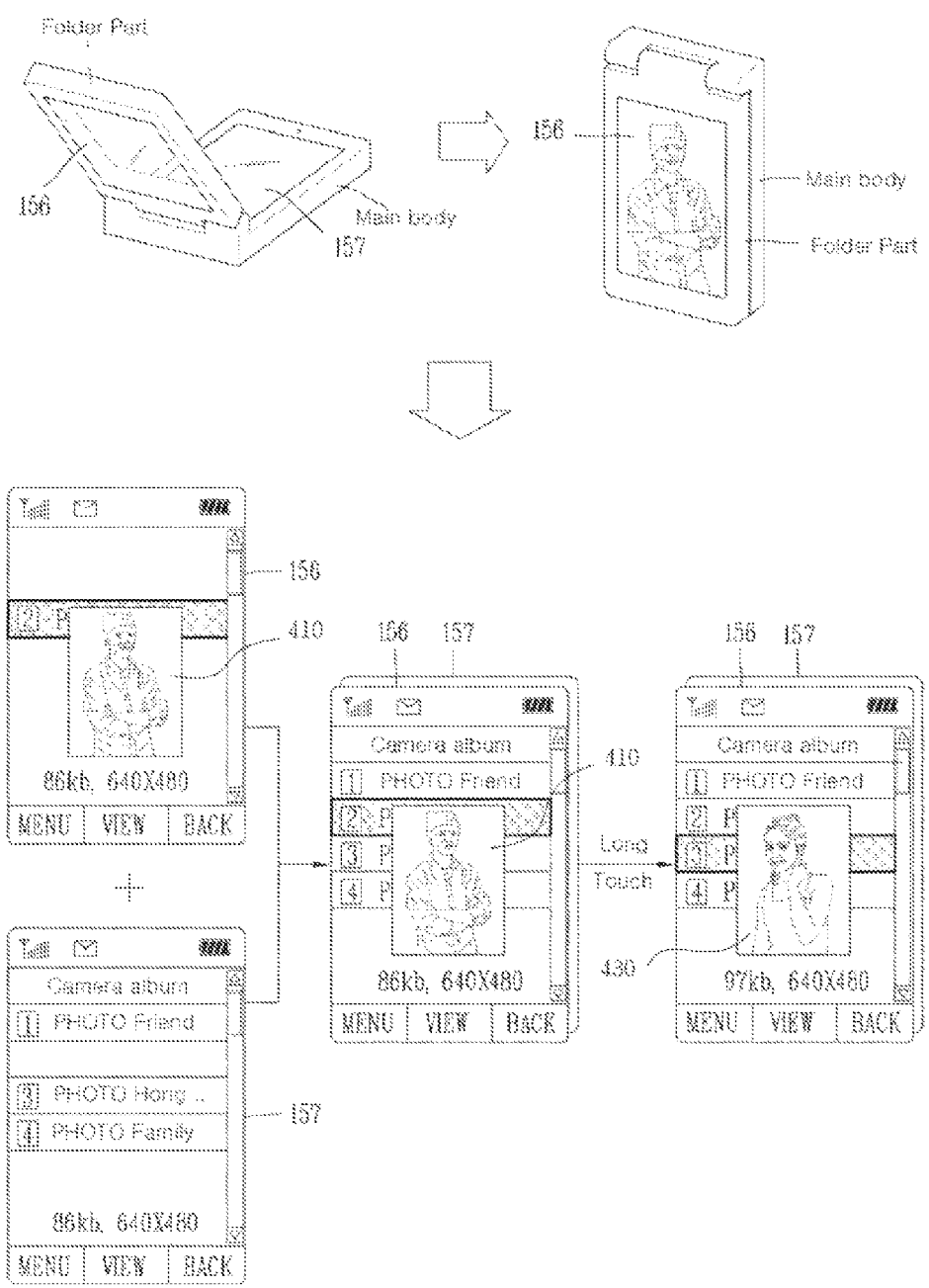
FIG. 4 is a diagram illustrating a method of controlling a touch action when a pair of display units are overlapped with each other.

FIG. 4 is a diagram illustrating a method of controlling a touch action for a pair of displays 156 and 157 overlapped with each other.

Referring to FIG. 4, a terminal shown in the drawing is a folder type terminal in which a folder part is connected to a main body.

A first display 156 provided to the folder part 400 is a light-transmissive or transparent type display such as a TOLED, while a second display 157 provided to the main body 410 may be a non-transmissive type display such as an LCD. Each of the first display 156 and second display 157 may include a touchscreen.

According to an embodiment, if a touch, such as a contact touch or proximity touch, to the first display or TOLED 156 is detected, the controller 180 selects or runs at least one image from an image list displayed on the TOLED 156 according to a touch type and a touch duration.

In the following description, a method of controlling information displayed on a second display 157 in response to a touch to the first display 156 exposed in an overlapped configuration is explained.

In the overlapped state, such as a state that the mobile terminal is closed or folded, the first display 156 is configured to be overlapped with the second display 157. In this state, if a touch which is different from a touch for controlling an image displayed on the first display 155, such as a touch having a duration greater than a predetermined period of time, is detected, the controller 180 enables at least one image to be selected from an image list displayed on the second display 157 according to the detected touch input. The result from selecting the image is displayed on the first display 156.

The touch which is detected as having a duration greater than a predetermined period of time is usable in selectively shifting an item displayed on the second display 157 to the first display 156. A touch which has a duration greater than a predetermined period of time may be referred to as a long touch.

Additionally, an item displayed on the first display 156 may be displayed on the second display 157 according to a touch input, such as flicking or swirling, to the first display 156. As illustrated in FIG. 4, a menu displayed on the second display 157 is displayed by being shifted to the first display 156.

Moreover, the controller 180 may execute a function associated with an image selected by the long touch and display a preview picture for the image on the first display 156 if another input, such as a drag, is detected with a long touch. As illustrated in FIG. 4, a preview image 420 for a second menu item is displayed.

While the preview image is outputted, If a drag toward a different image is performed on the first display 156 while maintaining the long touch when the preview image is displayed, the controller 180 shifts a selection cursor of the second display 157 and then displays the second image 430 selected by the selection cursor. After completion of the touch (long touch and drag), the controller 180 displays the preview image 410 which was originally selected by the long touch.

The touch action described above, long touch and drag, is similar to an example of when a proximity drag, a proximity touch corresponding to the drag, is detected together with a long proximity touch, such as when a proximity touch is maintained for a predetermined period of time on the first display 156.

The method of controlling the terminal in response to the touch action while in the overlapped state is also applicable to a terminal having a single display and non-folder type terminals with a dual display.

For clarity and convenience of the following description, a mobile terminal is assumed to comprise at least one of the components illustrated in FIG. 1. Specifically, a mobile terminal, to which the present invention is applicable, may include at least two display units. At least one display unit may include the transparent display unit 156 described in FIG. 4. One of the display units may be referred to as a main display unit 157 if it is able to perform an interaction with the transparent display unit while in an overlapped state. The main display unit 157 is distinct from the transparent display unit and may be hinged to the transparent display unit. Generally, the main display unit 157 is a non-transparent display, yet, if necessary, the main display unit 157 may have a configuration capable of transparent display functionality.

According to one embodiment of the present invention, a mobile terminal and controlling method thereof can implement a three-dimensional (3D) user interface using at least two display units including a transparent display unit.

In the following description, a 3D user interface implemented by the present invention is schematically explained with reference to FIG. 5.

Figure 5:
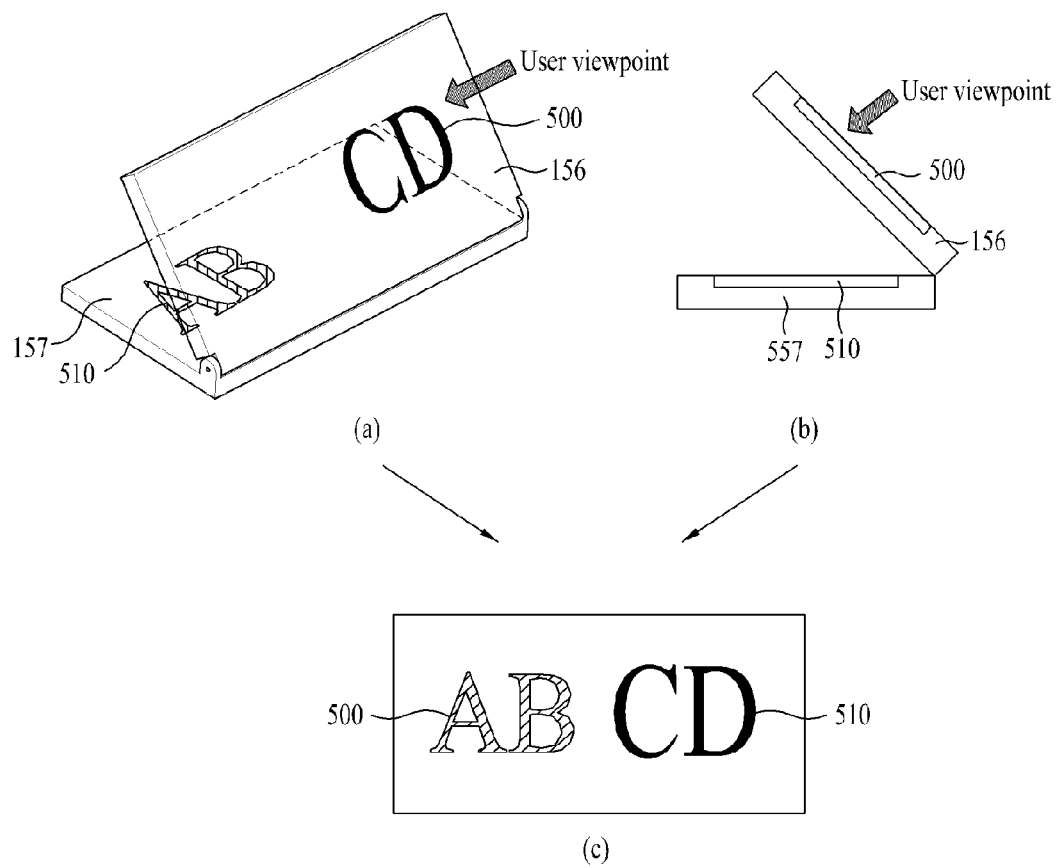
FIG. 5 is a diagram illustrating a 3D effect using a distance difference between two display units according to one embodiment of the present invention.

FIG. 5 is a diagram for generating a 3D effect using a distance measurement between two display units according to one embodiment of the present invention.

Referring to FIG. 5(*a*), a main display unit 157 and a transparent display unit 156 are arranged by being spaced apart at a prescribed angle from each other. As illustrated in FIG. 5(*a*) it is assumed that a user views the transparent display unit 156 from a front view. A front view refers to a view in which the main display unit 157 is positioned away from the user.

FIG. 5(*b*) shows the transparent display unit 156 from a lateral view.

In the above-described embodiments, the letters "CD" 500 displayed on the transparent display unit 156 and the letters "AB" 510 displayed on the main display unit 157 are located at distances which are different from a view point of a user, respectively, whereby the user views a 3D effect of the letters "CD" 500 and "AB" 510 according to a relative distance. In this example, an extent of the distance may vary according to a space between the transparent display unit 156 and the main display unit 157 or a relative size of the letters "CD" 500 and "AB" 510 displayed on the corresponding display unit. FIG. 5(*c*) illustrates an example of the display from a user's viewpoint of FIGS. 5(*a*) and 5(*b*).

FIG. 6 is a diagram illustrating a mobile terminal according to one embodiment of the present invention with reference to FIG. 5.

Referring to FIG. 6(*a*), the main display unit 157 is provided to a top-side of the mobile terminal 100, while the transparent display unit 156 can be rotatably connected via a hinge 108 to one lateral side of the plane having the main display unit 157. In particular, the transparent display unit 156 is folded onto the main display unit 157 and is then turned at a prescribed angle to provide a space 600 in-between. Preferably, the angle between the transparent display unit 156 and the main display unit 157 is set not to exceed 90 degrees.

The main display unit 157 can be implemented with a touchscreen. Both sides of the transparent display unit 156 may also be implemented with touchscreens, respectively. Alternatively, only one side of the transparent display unit 156 may include a touchscreen.

In the following description, a fold state will refer to a scenario when the transparent display unit 156 is closed over the main display unit 157. Additionally, a tilt state will refer to a scenario when the transparent display unit 156 is turned at a prescribed angle against the main display unit 157. In the fold state, a backside will refer to a face of the transparent display unit 156 opposite to the main display unit 157. Moreover, a front side will refer to a face opposite to the backside of the transparent display unit 156.

A camera may be provided to one lateral side of the mobile terminal 100, and preferably on the front side of the transparent display unit 156. The controller 180 may recognize a relative position of a user with reference to the mobile terminal 100 via face recognition from a picture photographed via the camera 121.

A sensing module 140 may be provided on the main display unit 157. The sensing module 140 may detect a motion from an input device, such as a finger or a stylus pen, in the space 600 provided between the main display unit 157 and the transparent display unit 156. The controller 180 may execute a function corresponding to input detected by the sensing module 140. Alternatively, a camera may recognize a position of the pointer by photographing the input device.

FIG. 6(*b*) illustrates one example of using the mobile terminal shown in FIG. 6(*a*).

Referring to FIG. 6(*b*), the mobile terminal 100 according to one embodiment of the present invention is preferably tilted and placed in a manner that the main display unit 157 may be viewed via the transparent display unit 156. A picture 620 displayed on the main display unit 157 can become a background image of the picture 610 displayed on the transparent display unit 156. Moreover, a user can be provided with a 3D effect attributed to distance and angle differences between the two pictures. Specifically, a 3D picture is displayed as the picture 610 displayed on the transparent display unit 156.

If the mobile terminal 100 is located to oppose a user in the above manner, the camera 121 is set to face the user. Therefore, the camera 121 can take a picture of the user and may provide the picture to the controller 180.

Moreover, the user may input a command via a touch or a proximity touch to the front side or backside of the transparent display unit 156 or the main display unit 157. Alternatively, a user may input a command via the position recognition provided by the sensing module 140 or the camera.

Figure 7:
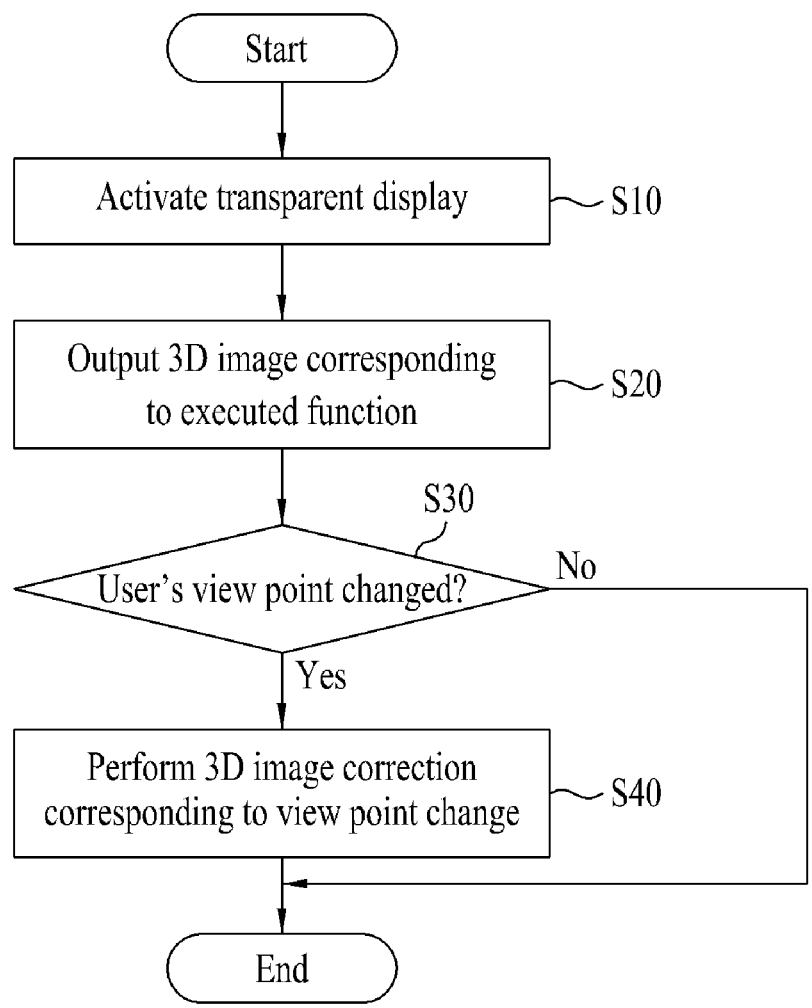
FIG. 7 is a flowchart for a method of operating a mobile terminal according to one embodiment of the present invention.

A method of operating the above-configured mobile terminal is explained with reference to FIG. 7. FIG. 7 is a flowchart for a method of operating a mobile terminal according to one embodiment of the present invention.

Referring to FIG. 7, a transparent display can be activated when entering a tilt state [S10]. The transparent display in the tilt state may be activated if a specific application is executed or a user manipulates a prescribed menu.

Subsequently, a 3D user interface corresponding to an executed function can be output via the transparent display unit 156 or the main display unit 157 [S20]. In doing so, as mentioned in the foregoing description, a two-dimensional (2D) picture can be output to the transparent display unit 156. Alternatively, the 3D image shown in FIG. 6(*b*) can be output to the transparent display unit 156.

When the camera 121 is provided to one lateral side of the mobile terminal 100 the controller 180 may detect if a user's view point is changed using a picture taken via the camera 121 [S30].

After detecting that the user's view point is changed via the picture taken via the camera 121, the controller 180 may correct the picture displayed on the transparent display unit 156 or the main display unit 157 to provide the user with a 3D image suitable for the changed view point [S40].

In the following description, detailed examples for applying the above described mobile terminal operating method are explained. To help the understanding of the following description, details of an exterior, such as a housing shape or position of user input unit, of the mobile terminal are not depicted but the relative arrangement of the components related to the 3D user interface are schematically explained.

The steps S30 and S40 mentioned in the above description are explained in detail with reference to FIG. 8 as follows.

FIG. 8 is a diagram of one example of correcting a picture displayed on a transparent display unit via recognition of a user's position relative to a mobile terminal according to one embodiment of the present invention.

Referring to FIG. 8(a), when a 3D user interface is activated in the mobile terminal in a tilt state, it is able to display a hexahedron 800 on the transparent display unit 156. In this example, if a quadrangle is displayed on a facet of the hexahedron 800, this facet is assumed as a front facet. If a triangle is displayed on a facet of the hexahedron 800, this facet is assumed as a right lateral facet.

The controller 180 may determine a user's position relative to that of the mobile terminal 100 using a picture taken via the camera 121. The following description explains one example of a user located opposite to a front side 810 of the mobile terminal and another example of a user located opposite to a lateral side 820 of the mobile terminal.

In the example of determining that the user is located opposite to the front side 810 of the mobile terminal, the controller 180 may display a picture of a front facet of the hexahedron 800 on the transparent display unit 156 (FIG. 8(b)). Additionally, in the example of determining that the user is located opposite to the lateral side 820 of the mobile terminal, the controller 180 may display a perspective picture, such as a picture of front and lateral sides, of the hexahedron 800 on the transparent display unit 156 (FIG. 8(c)).

The mobile terminal 100 according to the present invention may output a picture of a 3D object corresponding to a view point of a user via the transparent display unit 156, thereby providing a 3D image effect to the user.

A mobile terminal according to the present invention may change a position of a picture displayed via a transparent display unit in consideration of a user's view point as well as a configuration of the displayed picture. Such a position change is effective to provide a 3D user interface to a user when a picture displayed on the transparent display unit is interoperating with a picture displayed on a main display unit. This is explained with reference to FIG. 9 as follows.

FIG. 9 is a diagram of another example of correcting a picture displayed on a transparent display unit via recognition of a user's position relative to a mobile terminal according to an embodiment of the present invention.

The transparent display unit 156 and the main display unit 157 provided to the mobile terminal according to the present embodiment are rotatably hinged to each other. To better understand the present embodiment, it is assumed that the two displays units are positioned in parallel with each other. Additionally it is assumed that the controller 180 detects or monitors a user's position via a picture taken with the camera 121.

In the example illustrated in FIG. 9(a), it is assumed that a view point 900 of a user faces a front side of the transparent display unit 156. Accordingly, the user may view a picture 910 displayed on the transparent display unit 156 as if the picture 910 is located at a center 920 of cross hairs displayed on the main display unit 157.

After setting the configuration illustrated in FIG. 9(a), the view point 900 of the user is changed into the configuration illustrated in FIG. 9(b) when the user moves in a right direction. In this example, the controller 180 shifts the picture 910 displayed on the transparent display unit to a right side from a previous position 940. Thus by the user's viewpoint, the user sees the picture 910 displayed on the transparent display unit 156 as if the picture 910 is located at the center 920 of the cross hairs displayed on the main display unit 157.

Accordingly, using the position changing method described above, the picture displayed on the transparent display unit 156 is viewed as always being located at the fixed point in the picture displayed on the main display unit 157.

In order to reduce a load of the controller 180, which is generated from calculating a rotation or position shift of a 3D object according to the view point change, the controller 180 may use a lookup table comprising pre-calculated correction values according to a user's view point and a distance or angle of the arrangements of the transparent display unit 156 and the main display unit 157. The lookup table may be stored in the memory 160.

In the following description, a method of representing a 3D image on a transparent display unit is explained.

A method of representing a 3D image on a 2D display unit comprises configuring a 3D object into a polyhedron using a plurality of polygons and representing a shape seen at a specific view point as a 2D image. In this example, each of the polygons indicates a polygon of a smallest basic unit for configuring a 3D graphic. Each facet of the polyhedron, including a plurality of the polygons, is covered with a previously prepared texture to represent one of various colors, patterns, or texts. For example, in order to configure the hexahedron 800 shown in FIG. 8, the controller 180 first forms six facets by connecting twelve lines to eight vertexes and then covers three of the six facets with textures of a circle, a triangle, and a quadrangle, respectively. Afterwards, if the hexahedron formed by the above described method is rotated to correspond to a view point of a user, the controller 180 is able to output a picture seen in one direction, as shown in FIG. 8(b) or FIG. 8(c), to the transparent display unit 156.

A second method for displaying a 3D image may comprise enabling a user to feel a depth and reality of a 3D image in a manner of providing two different 2D images to a pair of user eyes to be merged together in the user's brain. This method requires additional equipment.

For example the additional equipment may comprise polarized film glasses. This method is referred to as a stereoscopic system. In this method, one image may be generated from mixing two different images provided to a pair of eyes via the polarized glasses.

Alternatively, a parallex barrier type display unit may be utilized to provide a 3D image. This is explained with reference to FIG. 10 as follows.

FIG. 10 illustrates a method of implementing a 3D image on a parallex barrier type display unit applicable to embodiments of the present invention.

Referring to FIG. 10, a structure of a parallex barrier type display unit 151 for displaying a 3D image may be configured in a manner that a general display device 151a is combined with switch LC (liquid crystals) 151b. A propagating direction of light is controlled by activating an optical parallex barrier 1000, as shown in FIG. 10(*a*), using the switch LC 151*b*, whereby the light is separated into two different lights to arrive at left and right eyes, respectively. Thus, when an image generated from combining an image for the right eye and an image for the left eye together is displayed on the display device 151*a*, a user sees the images corresponding to the eyes, respectively, thereby feeling the 3D or stereoscopic effect.

Alternatively, referring to FIG. 10(*b*), the parallex barrier 1000 attributed to the switch LC may be electrically controlled to enable light to be fully transmitted therethrough, whereby the light separation due to the parallex barrier is avoided. Therefore, the same image can be seen through left and right eyes. The parallex barrier type display may provide for both a 2D or 3D image.

The above mentioned 3D image displaying method is applicable to the transparent display unit 156 according to one embodiment of the present invention. If a method using the additional equipments is adopted, either the transparent display unit 156 or the main display unit 157 can be provided to the mobile terminal. Yet, according to the present invention, the picture displayed on the transparent display unit 156 can interoperate with the other image displayed on the main display unit 157. Preferably, both types of display units are provided to the mobile terminal.

In the following description, a command inputting method in a mobile terminal according to the present invention is explained with reference to FIG. 11.

FIG. 11 is a diagram for a method of inputting a command to a mobile terminal and a method of recognizing the command according to one embodiment of the present invention.

Referring to FIG. 11(*a*), the mobile terminal 100 may utilize the proximity sensor 141 at a position of the sensing module 140 described with reference to FIG. 6(*a*). The controller 180 recognizes the position of the input device sensed by the proximity sensor 141 as a user's command input and then enables a function corresponding to the command to be executed.

As mentioned in the foregoing description with reference to FIG. 4, the proximity sensor 141 may recognize a distance between the pointer and the sensor in a manner of dividing the distance into at least two steps, such as d1, d2 and d3. If the haptic module 154 is provided to the mobile terminal, the controller 180 generates a different kind of haptic effect each time the pointer crosses each distance step.

In another example, referring to FIG. 11(*b*), a camera 123 may be provided for photographing a space generated between the transparent display unit 156 and the main display unit 157 when in a tilt state. In particular, the controller 180 recognizes a size and position of an input device appearing in a picture taken via the camera 123 and is thereby able to recognize the size and position as a user's command input. Moreover, in case of using the camera 123, the controller 180 is able to further recognize a gesture or pattern as well as the size and position of the pointer.

In another example, referring to FIG. 11(*c*), the mobile terminal 100 may recognize a touch input or a proximity touch input to a backside 1110 of the transparent display unit 156 or a specific point 1120 on the main display unit 157.

In another example, the mobile terminal 100 may utilize a method of using augmented reality (AR). In this example, the augmented reality refers to a virtual reality in which a real environment seen via user's eyes and a virtual environment merge together to provide one picture. Although the augmented reality uses the virtual environment including a computer graphic, the real environment plays a main role and the computer graphic plays a role in providing information necessary for the real environment. Namely, a real image is overlapped with a 3D virtual image, whereby a distinction between the real environment and the virtual picture becomes vague.

For example, a headset type computer screen device which may be a wearable computer device enables a user to view a real environment overlapped with computer graphics or characters.

In another example, an input unit for inputting a specific pattern on a surface of a real object is photographed via a camera. A type and position of the input unit are recognized from the photographed picture and the photographed picture is then output as being overlapped with a digital image corresponding to the input unit. An augmented reality implementing the aforementioned method is generally referred to as a "marker system."

Additionally, a controller may determine an object via an image obtaining means, such as a camera, for obtaining a real image without an input unit. Relevant information is obtained according to the determined object, the obtained relevant information is then added to the obtained real image. This method is applicable to the implementation of the augmented reality. The aforementioned process is referred to as a "markerless system." In the following description, some embodiments of the present invention are explained through the implementation of the marker system, by which the present invention is non-limited. These embodiments are also applicable to the markerless system.

In the example of using the marker system, a user may input a command in a manner of moving a pointer having a specific pattern in a space generated between the transparent display unit 156 and the main display unit 157. Alternatively, the pointer marker can be replaced by a pointer marker displayed on the main display unit. For example, referring to FIG. 11(*d*), a user may apply a touch and drag input to a marker 1160 displayed on the main display unit 156 using a pointer 1100. The controller 180 may then move a 3D object 1150 displayed on the transparent display unit 156 to correspond to a motion of the marker 1160. In this example, in order to photograph the marker, the mobile terminal may be provided with the camera 123 shown in FIG. 11(*b*).

Thus, a mobile terminal according to the present invention receives an input of a command from a user using one of the above described methods or can recognize a command input from a user by combining at least two of the above described methods.

Examples for the detailed functions executable in the mobile terminal according to one embodiment of the present invention through the above mentioned structure and command inputting method of the mobile terminal are explained with reference to FIGS. 12 to 16 as follows.

First, a game function is described with reference to FIG. 12.

FIG. 12 is a diagram of one example for a game in a mobile terminal according to one embodiment of the present invention.

Referring to FIG. 12(*a*), a game may be played when two mobile terminals 100*a* and 100*b* are placed within a distance from each other. In particular, the two mobile terminals 100*a* and 100*b* are set to interoperate with each other via the wireless communication unit 110. A character 1210 displayed on the transparent display unit 156, while in a tilt state, may be manipulated by a backside touch to implement a fighting game.

In another example of a game executable in a mobile terminal according to one embodiment of the present invention, referring to FIG. 12(*b*), a game may be played in a manner of pushing away one of cubic blocks 1220 laid in a prescribed shape without breaking the prescribed shape.

In playing this game, a user may change a view point of looking at the transparent display unit 156 to select a block to push away or check a configuration of the laid blocks. In this case, the controller 180 determines the user's view point using a picture photographed via the camera 121 and then rotates the shape of the cubic blocks 1220 to correspond to the view point.

When a user pushes away one of the blocks, a position of a pointer, such as a user's finger, may be recognized by the controller 180 via at least one of the methods described with reference to FIG. 11. In this example, since the controller 180 has to recognize the position of the finger in the space generated between the transparent display unit 156 and the main display unit 157, it is preferable to use at least one of a camera 123 or the proximity sensor 141. For example, if a user uses a marker having a prescribed pattern printed on its end portion, the controller 180 recognizes or acquires a position of the marker using a picture photographed via the camera 123 and is then able to move a block corresponding to the position of the marker.

Furthermore, a mobile terminal according to one embodiment of the present invention may provide a user with a navigation function using a 3D user interface. This is explained with reference to FIGS. 13 and 14. Assume that a mobile terminal shown in FIG. 13 or FIG. 14 is provided with a position location module 115 capable of receiving position information from a satellite.

Figure 13:
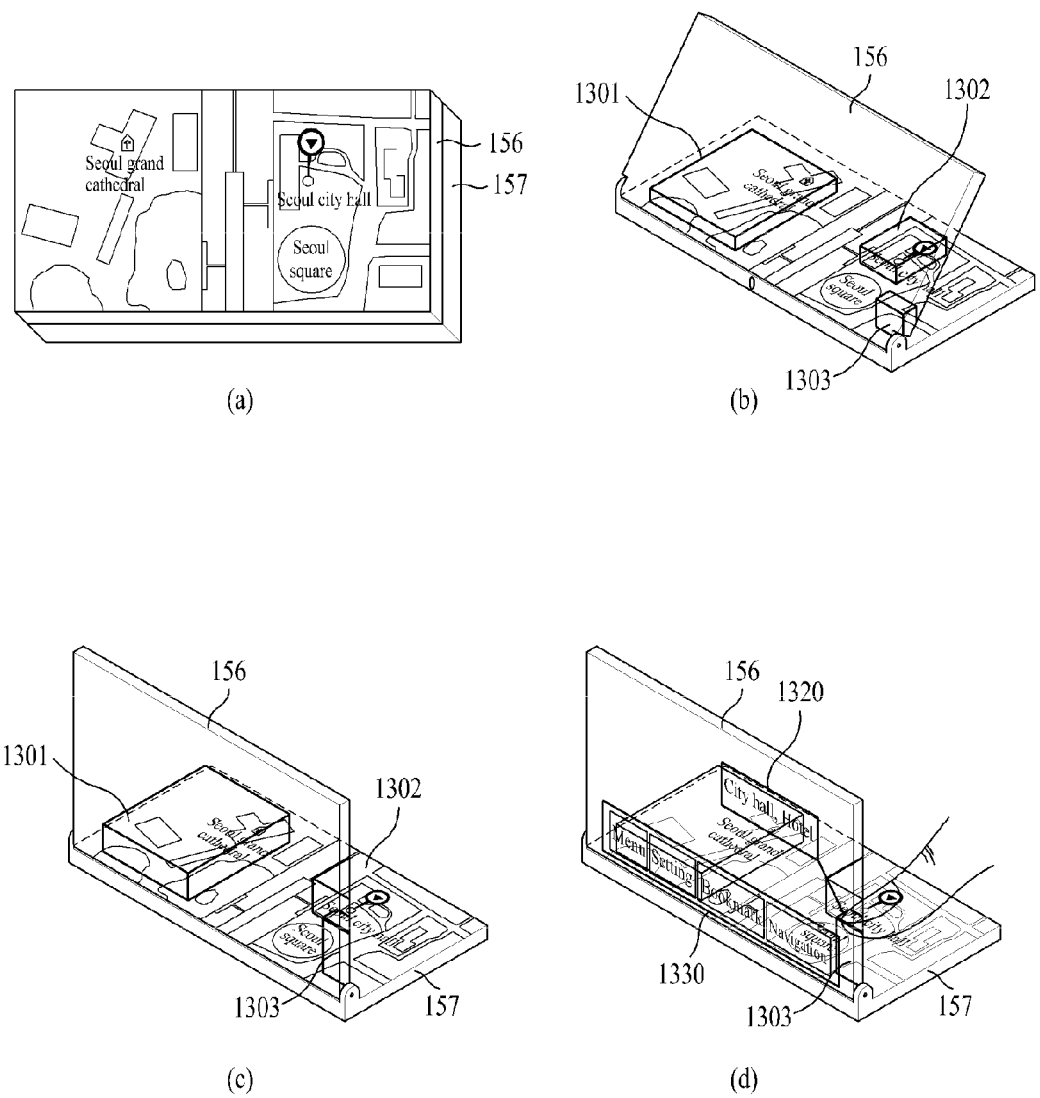
FIG. 13 is a diagram of examples of providing a 3D map and geographical information using the 3D map in a mobile terminal according to one embodiment of the present invention.

FIG. 13 is a diagram of examples for providing a 3D map and geographical information using the 3D map in a mobile terminal according to one embodiment of the present invention.

Referring to FIG. 13, in an initial stage, a mobile terminal is able to display a 2D map via a main display unit 157 while a transparent display unit 156, as shown in FIG. 13(*a*), is in a fold state that it is folded over the main display unit 157.

When a user intends to view a 3D map, the user may enable the transparent display unit 156 to enter a tilt state by turning the transparent display unit 156 by about 45 degrees. Accordingly, 3D building objects 1301, 1302, and 1303 can be displayed via the transparent display unit 156. The 3D buildings correspond to at least some of major buildings displayed in the 2D map displayed on the main display unit 157. In this example, when a user focuses on the main display unit 157, each of the 3D building objects is preferably displayed in a manner of interoperating with the respective buildings of the 2D map. In other words, a bottom of each of the 3D building objects is preferably displayed in a manner of matching a size and position of each of the buildings marked on the 2D map displayed on the main display unit 157.

When attempting to scroll a map to search another adjacent point from a currently displayed point, a user scrolls the map by performing a touch and drag on the main display unit 157 in a specific scroll direction. Moreover, when incorporating a multi-input touchscreen, the main display unit 157 may simultaneously recognize multiple touch inputs, and thereby allow a user to rotate a map in a manner of performing a second touch for drawing an arc centering on a first point while maintaining a first touch to the first point on the main display unit 157. As the map on the main display unit 157 is rotated, the 3D building objects displayed on the transparent display unit 156 can be interoperably rotated. The aforementioned method of inputting the command for the scroll or rotation of the map is merely exemplary, by which the present invention is non-limited. Alternatively, various command inputting methods are applicable to the present invention.

As shown in FIG. 13(*c*), the 3D building objects 1301, 1302 and 1303 displayed on the transparent display unit 156 can be displayed larger as compared to the building objects shown in FIG. 13(*b*) if the user further rotates the transparent display unit 156 approximately 90 degrees.

In order to acquire information on a specific building (FIG. 13(*d*)), the user may point to a specific 3D building object 1303 via an input unit such as a finger 1310. The controller 180 determines which 3D building object is pointed to by the finger 1310 via at least one of the former methods described with reference to FIG. 11, and may display information on the corresponding building 1303, such as a name 1320 of the building, on the transparent display unit 156. Moreover, menus 1330 of additional functions executable in association with the corresponding building can be further displayed on the transparent display unit 156 together with the information on the corresponding building. For example, the corresponding building may be added to a bookmark or navigation to the corresponding building can be executed. The menus 1330 displayed on the transparent display unit 156 may be selected from either the front or the back of the transparent display unit 156.

Additionally, the user may increase or decrease the size of the 3D building objects 1301, 1302 and 1303 displayed on the transparent display unit 156 via an input. For example, when viewing the 3D building objects 1301, 1302 and 1303 displayed on the transparent display unit 156 as illustrated in FIG. 13(*b*), the user may perform a multi touch input, such as a double tap to enlarge the size of the 3D map (not shown), furthermore, the user may perform a multi touch input, such as a triple tap to decrease the size of the 3D map (not shown). Increasing and decreasing the size of the 3D map is not limited to the size of the buildings and is similar to a "zoom in" or "zoom out" function. Additionally, the increasing and decreasing of the size of the 3D map is not limited to a multi touch input and may be performed by a predetermined input or an input set by the user.

The navigation function is executable in a manner that 3D building objects are interoperably displayed on the 2D map shown in FIG. 13(*b*) or FIG. 13(*c*) or can be performed in a manner of matching real geographical features. This is explained with reference to FIG. 14 as follows.

FIG. 14 is a diagram of another example of executing a navigation function in a mobile terminal according to one embodiment of the present invention.

Referring to FIG. 14(*a*), it is assumed that the navigation has been selected from the menu 1330 (FIG. 13(*d*)). The present embodiment is applicable to navigation in response to a search via an input of address or destination name.

In this example, the menu 1410 indicating that the navigation function for the specific building 1303 can be maintained on the transparent display unit 156. A message 1420 for instructing the user to rotate the transparent display unit 156 may be further displayed.

Once the transparent display unit 156 is rotated according to the rotation instruction message 1420 (FIG. 14(*b*)), a path instruction image 1440 may be displayed on the transparent display unit 156 to display real geographical features, such as roads and streets. Moreover, a destination 1450 can be displayed on the transparent display unit 156 to match the real geographical features. In this example, information on major adjacent geographical features, such as buildings, can be displayed in addition to the destination 1450. If another terminal user is performing the same function, information on the other terminal user can be additionally displayed on the transparent display unit 156. In this example, if another user is detected via the short range communication module or position information on another user is provided via the wireless communication module, the information on another user can be displayed. Optionally, a function, such as sending a message or making a phone call, can be performed according to information of another user displayed on the transparent display unit.

In the following description, a message and gift delivering function is explained with reference to FIG. 15 and FIG. 16.

FIG. 15 is a diagram of one example for displaying a 3D message in a mobile terminal according to one embodiment of the present invention.

Referring to FIG. 15(a), a 3D message is delivered to a mobile terminal in a fold state. Text of the message and a message for instructing to change into a tilt state can be displayed on a transparent display unit 156. In this example, the 3D message can include a multimedia message (MMS).

When a user enables the mobile terminal to enter the tilt state, as shown in FIG. 15(b), a cake 1520, which is a 3D gift object, can be displayed on the transparent display unit 156. Moreover, additional messages 1530, 1531, and 1532 relevant to a general message can also be displayed on the transparent display unit 156.

Although the 3D gift object included in the 3D message shown in FIG. 15 is simply displayed, one embodiment of the present invention provides a 3D interactive gift object. This is explained with reference to FIG. 16 as follows.

FIG. 16 is a diagram of one example for displaying a 3D interactive gift with a user in a mobile terminal according to one embodiment of the present invention.

FIG. 16(a) assumes a situation after the mobile terminal shown in FIG. 15(a) has been rotated to enter the tilt state.

Referring to FIG. 16(a), a gift box 1610 tied up with a wrap string is displayed as a 3D gift object on a transparent display unit 156. If a user takes an action, such as pulling the wrap string 1620 via an input device, such as a user's hand 1600, an image for showing that the string 1620 is loosened can be displayed via the transparent unit 156.

Referring to FIG. 16(b), if the user takes an action of lifting a box lid 1611 using the user's hand 1600, the lid 1611 can be removed.

After the lid 1611 has been removed, referring to FIG. 16(c), a stuffed animal 1640 can be displayed as a 3D gift object on the transparent display unit 156. The user takes an action of grabbing the stuffed animal 1640 to interact with the image, such as a rotation, a size adjustment, or a shift to a specific point. A menu applicable to the 3D gift object such as the stuffed animal 1640 can be displayed on a main display unit 157 as well as additional menu icons 1630. In this example, the user may store the 3D gift object as a picture file by dragging and dropping the stuffed animal 1640 to a photo menu region 1650 on the main display unit 157.

According to a second embodiment of the present invention, a mobile terminal is provided with at least two cameras arranged in a same direction by being spaced apart from each other with a prescribed distance in-between. Therefore, the mobile terminal is able to generate and play back a 3D picture or image.

In order to generate a 3D picture, a 3D polyhedron is formed using the polygons, the polygons are covered with a prepared 2D texture. Another method for generating a 3D picture comprises at least two images generated from photographing a same object in different viewpoints and combined together or different images can be seen intact according to the user's viewpoint. Yet another method for generating a 3D picture comprises, generating one image for a right eye and the other image for a left eye by combining at least two images generated from photographing a same object at different viewpoints together, both of the right and left eye images are simultaneously displayed, and the respective images are made to arrive at both eyes of a user, via polarized glasses or a parallex barrier. In this example, a method of generating and playing back a 3D image is explained with reference to FIG. 17 as follows.

FIG. 17 is a diagram of one example for generating and displaying a 3D photo in a mobile terminal according to another embodiment of the present invention.

Referring to FIG. 17, a mobile terminal according to an embodiment of the present invention has a configuration similar to that of the mobile terminal according to other embodiments of the present invention. Yet, referring to FIG. 17(a), two camera modules 121a and 121b for recognizing a motion of a pointer in a space provided between a transparent display unit 156 and a main display unit 157 are provided in a manner of being spaced apart from each other with a prescribed distance in-between.

Once two camera modules are arranged by being spaced apart from each other at a prescribed distance, referring to FIG. 17(b), when an object 1700 is photographed, the cameras 121a and 121b have different viewpoints due to the arranged interval, respectively.

A result of photographing is explained with reference to FIG. 17(c) as follows. First, a picture of an object 1700 photographed via a left camera 121a is shown in 1710. A picture of the object 1700 is photographed via a right camera 121b is shown in 1730. The controller 180 synthesizes the left picture 1710 and the right picture 1730 together to generate the object 1700 shown in 1720. Therefore, the controller 180 is able to play back a 3D picture or image in a manner of detecting a user's eyes via the above mentioned method according to one embodiment of the present invention and then display a picture of an object corresponding to a direction of the user's eyes via the transparent display unit 156.

According to another method of generating and outputting a 3D image, a specific focal length is set for each camera under the control of the controller 180 and an image deviating from a focus is then blurred. Subsequently, the controller 180 separates an image photographed via each of the cameras into an in-focus part, an out-of-focus, and blurred part. An image corresponding to the in-focus part is displayed via the transparent display unit 156, while the out-of-focus part is displayed via the main display unit 157. Thus, a 3D image may be provided to a user.

In another example of a mobile terminal having two camera modules according to another embodiment of the present invention, the mobile terminal may simultaneously photograph one object using cameras by differentiating focal distances of the cameras from each other. For this, at least one of two cameras is preferably provided with a zoom function of adjusting a focal distance. In particular, for example, the controller 180 controls one camera to photograph a same object with a wide angle and controls the other camera to photograph the same object with telephoto. The mobile terminal may then generate a photograph from one photographic event with two different angles of view.

In a further example, the mobile terminal may apply a different image filter to an image photographed via each of the cameras. In this example, the image filter refers to an additional effect given to an image photographed by a preset method. For instance, an image photographed via one camera is set to be automatically converted to black and white, while an image photographed via the other camera is set to be automatically converted to a sepia tone. Through this, a visual effect may be applied to the photograph.

In the above described embodiments, the transparent display unit and the main display unit are explained assuming that the mobile terminal includes the transparent and main display units of which are respectively hinged to each other by contacting each other. This is just one example for one type of mobile terminal according to the present invention. The transparent display unit and the main display unit can be arranged in various manners for generating a 3D effect attributed to a spaced distance or angle in-between. For instance, the main display unit and the transparent display unit can be connected together using at least two hinges. Alternatively, the main display unit and the transparent display unit can be connected together to enable a pivot using at least one ball joint to freely adjust arrangement. In this case, a stopper or latch for fixing a position by a plurality of steps can be provided to such a connecting means as a hinge, a pivot, a ball point and the like. The controller can further include a means for electronically providing information on an interval or angle between the main display unit and the transparent display unit.

Accordingly, a fold state or a tilt state can be changed into another terminology corresponding to a system of spacing two kinds of display units apart from each other.

Meanwhile, according to a further embodiment of the present invention, the above-described methods can be implemented in a programmable recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a main display unit comprising a first display unit;
   a transparent display unit comprising a second display unit, the transparent display unit being attached to the main display unit such that the transparent display unit may be viewed at an angle in comparison to the main display unit; and
   a controller controlling a three-dimensional (3D) and a two-dimensional (2D) image to be output by selectively displaying an image on at least the first display unit or the second display unit while the main display unit and the transparent display unit are positioned at an angle,
   wherein at least one 2D object is displayed on the first display unit when the mobile terminal is in a closed state, and when the main display unit and the transparent display unit are positioned at an angle from the closed state, at least one 3D object is displayed on the second display while displaying the at least one 2D object, and
   wherein each of the at least one 3D object corresponds to each of the at least one 2D object.

2. The mobile terminal of claim 1, wherein the 3D image is visible when the second display unit faces a user.

3. The mobile terminal of claim 2, wherein the 2D image is simultaneously displayed on the first display unit when the 3D image is visible from the second display unit.

4. The mobile terminal of claim 3, further comprising a memory unit configured to store a lookup table including a correction value for correcting the position of the image displayed on the second display unit according to the detected view point of the user, wherein the controller performs the position correction of the image displayed on the second display unit by referring to the lookup table.

5. The mobile terminal of claim 1, wherein the 2D image is displayed on the first display unit when the main display unit and the transparent display unit are positioned at an angle.

6. The mobile terminal of claim 1, wherein the 2D image is displayed on the second display unit.

7. The mobile terminal of claim 1, wherein the transparent display unit is deactivated when the mobile terminal is in the closed state, such that the transparent display unit covers the main display unit.

8. The mobile terminal of claim 1, further comprising a first camera configured to photograph a user's image, wherein the controller detects a viewpoint of the user via the user's image, corrects a position of an image displayed on the second display unit to correspond to the detected viewpoint, and controls the image displayed on the first display unit to be displayed at a predetermined position on the first display unit.

9. The mobile terminal of claim 1, wherein an interactive menu is displayed on the second display unit when the 3D image is visible from the second display unit.

10. The mobile terminal of claim 1, further comprising a pointer detecting unit configured to detect a position of a pointer in a space formed between the transparent display unit and the main display unit, wherein the controller controls an operation corresponding to the pointer position detected by the pointer detecting unit to be executed via a 3D user interface.

11. The mobile terminal of claim 1, wherein when a 3D map image is visible from the second unit, a 2D map corresponding to the 3D map is displayed on the first display unit and an interactive menu for receiving user input is displayed on at least the second display unit, or the first display unit.

12. The mobile terminal of claim 1, wherein at least a size or shape of the at least one 3D object is changed according to the angle.

13. A mobile terminal comprising:
   a main display unit configured to display a first display;
   a transparent display unit configured to display a second display, the transparent display unit being attached to the main display unit such that the transparent display unit may be viewed at an angle in comparison to the main display unit;
   a controller controlling a three-dimensional (3D) image to be output by selectively displaying an image on at least one of the first display and the second display while the main display unit and the transparent display unit are spaced apart from each other; and
   a pointer detecting unit configured to detect a position of a pointer in a space formed between the transparent display unit and the main display unit,
   wherein the controller controls an operation corresponding to the pointer position detected by the pointer detecting unit to be executed via a 3D user interface.

14. The mobile terminal of claim 13, wherein the 3D image is visible when the second display faces a user.

15. A method for displaying an image, the method comprising:
   displaying an image on a main display unit comprising a first display unit;
   displaying a second image on a transparent display unit comprising a second display unit, the transparent display unit being attached to the main display unit such that the transparent display unit may be viewed at an angle in comparison to the main display unit; and displaying a three-dimensional (3D) or a two-dimensional (2D) image by selectively displaying at least the first or second image while the main display unit and the transparent display unit are positioned at an angle, wherein at least one 2D object is displayed on the first display unit when the mobile terminal is in a closed state, and when the main display unit and the transparent display unit are positioned at an angle from the closed state, at least one 3D object is displayed on the second display while displaying the at least one 2D object, and wherein each of the at least one 3D object corresponds to each of the at least one 2D object.

16. The method of claim 15, wherein the 3D image is visible when the second display unit faces a user.

17. The method of claim 16, wherein the 2D image is simultaneously displayed on at least the first display unit or the second display unit when the 3D image is visible from the second display unit.

18. The method of claim 16, wherein an interactive menu is displayed on the second display unit when the 3D image is visible from the second display unit.

19. The method of claim 16, wherein when a 3D map image is visible from the second unit, a 2D map corresponding to the 3D map is displayed on the first display unit and an interactive menu for receiving user input is displayed on at least the second display unit the first display unit.

20. The method of claim 15, wherein the 2D image is displayed on the first display unit when the main display unit and the transparent display unit are positioned at an angle.

21. The method of claim 15, wherein the 2D image is displayed on the second display unit when the mobile terminal is in a closed state.

22. A method for displaying an image, the method comprising:

displaying an image on a main display unit comprising a first display unit;

displaying a second image on a transparent display unit comprising a second display unit, the transparent display unit being attached to the main display unit such that the transparent display unit may be viewed at an angle in comparison to the main display unit;

displaying a three-dimensional (3D) image by selectively displaying at least the first or second image while the main display unit and the transparent display unit are positioned at an angle;

detecting, via a pointer detecting unit, a position of a pointer in a space formed between the transparent display unit and the main display unit; and controlling an operation corresponding to the pointer position detected by the pointer detecting unit to be executed via a 3D user interface.

23. The method of claim 22, wherein the 3D image is visible when the second display unit faces a user.

* * * * *